No. 848,442. PATENTED MAR. 26, 1907.
M. C. CARR & C. R. BOHANNON.
TRACTION WHEEL AND RAIL.
APPLICATION FILED OCT. 5, 1905. RENEWED AUG. 22, 1906.
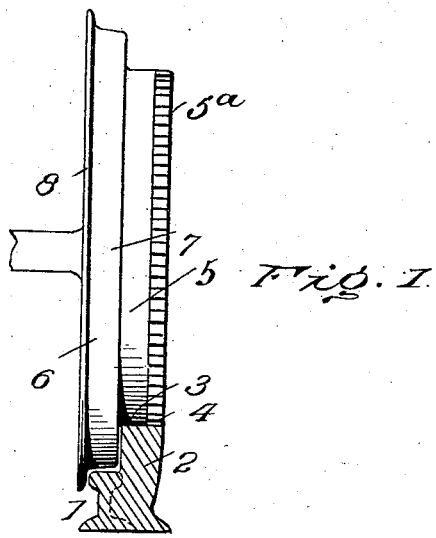

UNITED STATES PATENT OFFICE.

MATT C. CARR AND CHARLEY R. BOHANNON, OF EASY GAP, KENTUCKY.

TRACTION WHEEL AND RAIL.

No. 848,442.     Specification of Letters Patent.     Patented March 26, 1907.

Application filed October 5, 1905. Renewed August 22, 1906. Serial No. 331,625.

*To all whom it may concern:*

Be it known that we, MATT C. CARR and CHARLEY R. BOHANNON, citizens of the United States, residing at Easy Gap, in the county of Hardin and State of Kentucky, have invented certain new and useful Improvements in Traction Wheels and Rails, of which the following is a specification.

The object of this invention is to provide means whereby rolling-stock—such as cars, trains, and engines and the like—may be caused to travel more readily upgrade, the invention residing particularly in the special construction of rail for the track on the upgrade and a special form of wheel, which may be applied to the rolling-stock, the wheel and rail construction being designed to increase the traction to such an extent as to aid materially in increasing the speed of the rolling-stock in climbing a grade.

For full description of the invention and the merits thereof and also to acquire a knowledge of the details of construction of the means for effecting the result reference is to be had to the following description and accompanying drawings.

Figure 1 is a transverse section showing the rail and wheel mounted thereon, both embodying the invention. Fig. 2 is a perspective view looking toward the outer side of the wheel embodying the invention. Fig. 3 is a detail perspective view of the rail embodying the invention.

Corresponding and like parts are referred to in the following description and indicated in all the views of the drawings by the same reference characters.

In carrying out the invention the rail which will be used on the upgrade is of a form similar to those at present in use and is indicated at 1 in the drawings. Said rail is provided, however, with a vertical flange 2 integral therewith and projecting upwardly therefrom at a side of the ball or head of said rail. The flange 2 forms a part of a lateral enlargement of the rail and provides an auxiliary tread-surface 3 for the wheels of the rolling-stock, said surface being partially smooth and partially roughened. The roughened portion of the surface 3 on the flange 2 is preferably formed by providing teeth 4, arranged lengthwise on the flange, to coöperate with the wheels, as will be now pointed out.

The advantage arising in the provision of the combined smooth and toothed surfaces for the auxiliary tread 3 is important in that when the wheels of the rolling-stock engage said auxiliary tread the weight supported by said wheels is carried mainly by the smooth portion of the tread 3 and not by the toothed portion. This reduces friction, and thereby prolongs the life of the rails provided with auxiliary treads in that wear upon the teeth 4 is reduced to a minimum.

The wheel construction included in the invention is peculiar. The wheel embodies the usual construction comprising the body 6, having the smooth tread 7 ordinarily formed with the flange 8. The body of the wheel, however, is formed with an auxiliary rim or tread, (designated 5,) and this tread has a tread-surface thereof partially smooth and partially roughened in a manner corresponding with the formation on the flange 2 of the rails before described. It is preferable to roughen the tread 5 on the wheel by providing teeth $5^a$ extending entirely around the tread and adapted when the wheel travels on the rail 1 to mesh with the teeth 4 of said rail, and thereby increasing the traction in a manner similar to the traction secured on the common rack-rail and pinion systems used in mountainous districts to enable rolling-stock to climb steep grades. It is designed that the tread-surface 3 of the rail 1 be located quite a little higher than the ball or head of the rail in order that when the wheels are traveling on the rail 1 the auxiliary tread 5 of the wheel moving on the tread-surface 3 may elevate the tread 7 from the ball or head of the rail, the weight of the wheel and parts supported thereby being carried by the flange 2 of the rails entirely. To accomplish this, the surface of the tread 3 is elevated with regard to the surface of the ball or head of the rail 1 a greater distance than that between the auxiliary tread 5 of the wheels and the tread 7. Thus when the tread-surface 5 is traveling along the auxiliary tread 3 the main tread 7 of the wheel is not in contact with the ball or head of the rail, friction being reduced, and at the same time the coöperation of the treads 7 and 3 is such as to increase the power or traction in climbing a grade though the speed may be somewhat reduced. The wheels 6 may be used only on the engine of the train, if desired; but it will be understood that they may be applied to cars or any class of rolling-stock whatever.

Having thus described the invention, what is claimed as new is—

1. In combination, a rail comprising the usual head or ball provided with an auxiliary tread at a side thereof, said auxiliary tread embodying a smooth surface longitudinally thereof and a toothed surface adjacent to such smooth surface, the auxiliary tread being elevated with regard to the ball or head of the rail, and a wheel adapted to travel over the rail and provided with the usual main tread and with an auxiliary tread at a side thereof, the auxiliary tread of the wheel being adapted to travel along that of the rail and also having smooth and toothed surfaces for contact with like surfaces of the auxiliary tread of the rail.

2. In combination, a rail comprising the usual head or ball provided with an auxiliary tread at a side thereof, said auxiliary tread embodying a smooth surface longitudinally thereof and a toothed surface adjacent to such smooth surface, the auxiliary tread being elevated with regard to the ball or head of the rail, and a wheel adapted to travel over the rail and provided with the usual main tread and with an auxiliary tread at a side thereof, the auxiliary tread of the wheel being adapted to travel along that of the rail and also having smooth and toothed surfaces for contact with like surfaces of the auxiliary tread of the rail, the auxiliary tread of the rail being elevated with regard to the main tread thereof a distance greater than the distance between the auxiliary tread of the wheel and the main tread of said wheel whereby when the auxiliary tread of the wheel is traveling along that of the rail, the main tread of the wheel is not in contact with the ball or head of the rail.

3. As an article of manufacture, a rail comprising the usual ball or head portion and having an integral lateral enlargement projecting upwardly therefrom to form a flange, the upper surface of said flange forming an auxiliary tread and being partially smooth longitudinally thereof and partially toothed, for the purpose specified.

In testimony whereof we affix our signatures in the presence of two witnesses.

MATT C. CARR. [L. S.]
   CHARLEY R. BOHANNON. [L. S.]

Witnesses as to signature of Matt C. Carr:
 VIRGIL BURCHAW,
 BENJAMIN F. BURDRAM.

Witnesses as to signature of Charley R. Bohannon:
 VINSON A. VEISS,
 LEW. LASWELL.